United States Patent [19]

Stieff

[11] 4,216,380
[45] Aug. 5, 1980

[54] FIELD METHOD FOR DETECTING DEPOSITS CONTAINING URANIUM AND THORIUM

[76] Inventor: Lorin R. Stieff, P.O. Box 263, Kensington, Md. 20795

[21] Appl. No.: 879,578

[22] Filed: Feb. 21, 1978

[51] Int. Cl.$^2$ .......................... G01V 5/00; G01T 5/00
[52] U.S. Cl. ................................... 250/255; 250/472; 250/475.1
[58] Field of Search ............... 250/255, 253, 475, 472; 23/230 EP, 230.3

[56] References Cited

U.S. PATENT DOCUMENTS

| | | | |
|---|---|---|---|
| 2,330,829 | 10/1943 | Lundberg et al. | 250/255 |
| 2,551,449 | 5/1951 | Menke | 250/255 |
| 3,283,153 | 11/1966 | Geiger | 250/475 |
| 4,066,891 | 1/1978 | Gray | 250/255 |
| 4,081,675 | 3/1978 | Bartz | 250/255 |

OTHER PUBLICATIONS

Rotblat, "Progress in Nuclear Physics", vol. 1, Academic Press, N.Y., 1950, pp. 37–72.
Gingrich, "Results from a New Uranium Exploration Method", Trans. Soc. Mining Eng., 3–75, vol. 258, pp. 61–64.
Beck et al, "Track Etch Orientation Survey, Cluff Lake Area, N. Saskatchewan", Paper, C.I.M. Ann. Gen. Mtg., Toronto, 5–6–75.
Alter et al., "Uranium Exploration with the Track Etch Technique," Paper, Soc. Exploration Geophysicists, Denver, 10–12–75.
Foy et al., "A Stream Sediment Orientation Programme for Uranium in the Alligator River Province, N.T. Australia", Paper, Int. Geological Congress, Sidney, Australia, 8–16–76.
Gingrich et al, "Exploration for Uranium Utlizing the Track Etch Technique", Int. Geological Congress, Sidney, Australia, 8–16–76.

"Track Etch", Brochure, Terradex Corp., Walnut Creek, Ca., undated.
Fisher, "Application of Track Etch Radon Prospecting to Uranium Deposits, Front Range, Colorado"1, Paper, MMIJ & AIME Joint Mtg., Denver, 9-1-76.
Warren, "Recent Advances in Uranium Exploration with Electronic Alpha Cups", Geophysics, vol. 42, No. 5, 8–77, pp. 982–989.
Flynn, "The Determination of Low Levels of Po–210 in Environmental Materials", Anal. Chim. Acta., 43, 1968, pp. 221–227.
Bacon, "Applications of Pb–210/Ra–226 and Po–210/Pb–210 Disequilibria in the Study of Marine Geochemical Processes", Woods Hole Oceanographic Institution, Mass., 1976, unpublished manuscript WH01-76-8.

Primary Examiner—Alfred E. Smith
Assistant Examiner—Carolyn E. Fields
Attorney, Agent, or Firm—James C. Wray

[57] ABSTRACT

Locations of buried deposits containing uranium are determined by detecting the presence of Pb214, Bi214, Po214, Pb210, Bi210 and Po210 in solutions obtained by chemically leaching these elements from rocks and soil. Alpha sensitive nuclear emulsions are exposed to the alpha decay of Po214 and Po210. The emulsions are developed to display alpha tracks. Alpha track population as a function of sample size, volume of solution used, emulsion area and exposure measures concentration of Po214 and Po210 in the sample. Anomalus concentrations suggest presence of buried deposits containing uranium. Similar anomalus concentrations of alpha tracks from Bi212 and Po212 formed in emulsions exposed to leach solutions containing Pb212, Bi212 and Po212 suggest deposits containing thorium. Plotting normalized alpha track population (numbers of alpha tracks per gram, per square mm., per hour) and sample locations suggest mineral deposit locations.

4 Claims, 1 Drawing Figure

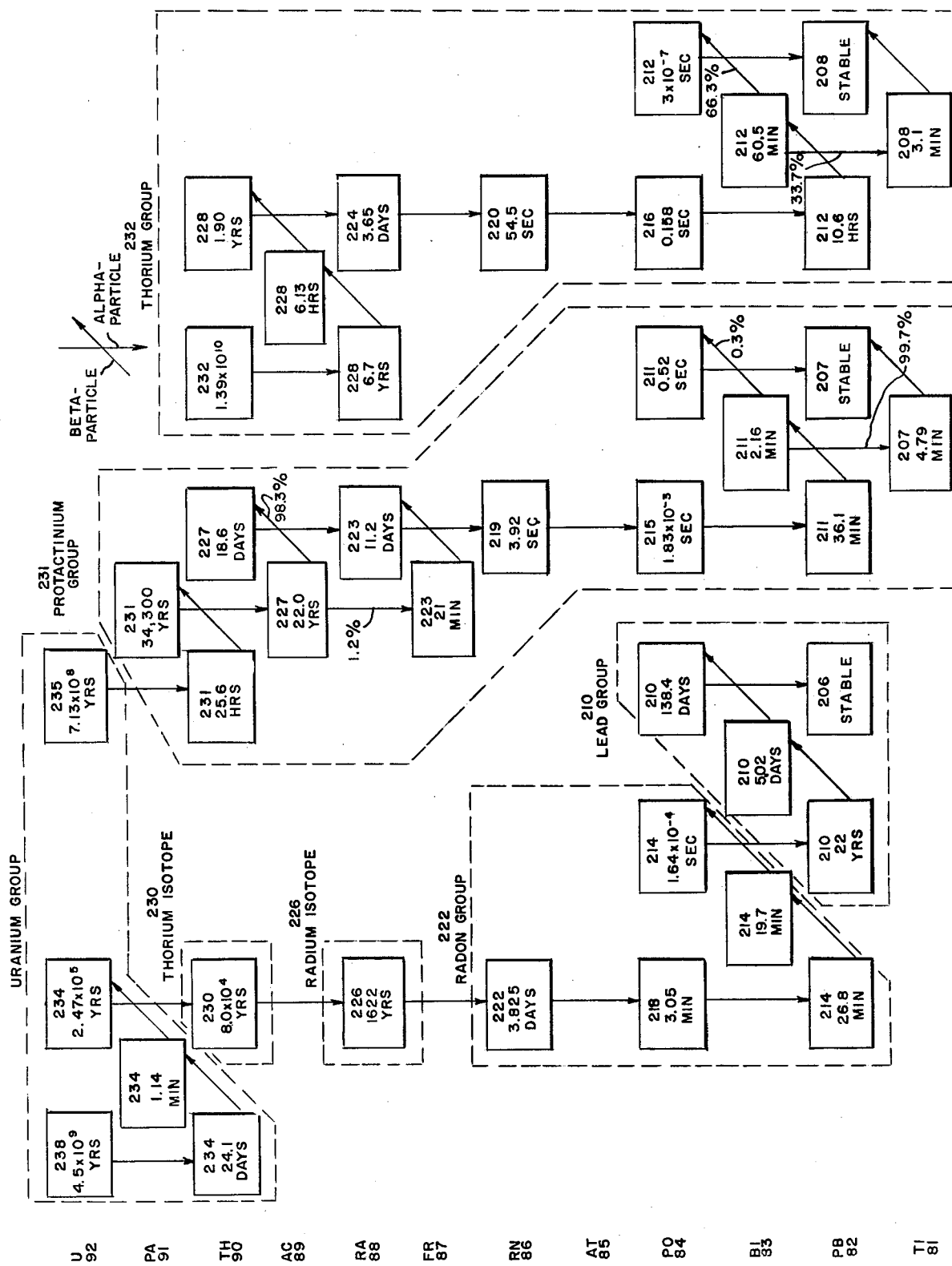

4,216,380

FIELD METHOD FOR DETECTING DEPOSITS CONTAINING URANIUM AND THORIUM

BACKGROUND OF THE INVENTION

This invention relates generally to geological exploration techniques and more particularly has reference to geological testing of rock and soil samples to determine the location of buried deposits containing uranium or thorium.

DESCRIPTION OF THE PRIOR ART

Pertinent United States and foreign patents are found in Class 250, subclasses 253, 255, 364, Class 23, subclasses 230EP and 230R and Class 73 of the official Classifications of Patents in the United States Patent and Trademark Office.

Examples of pertinent patents are U.S. Pat. Nos. 3,665,194, 3,988,587, 3,825,751, 4,055,762, 3,968,371, 4,064,436.

U.S. Pat. No. 3,665,194 shows a radon dosimetry system. A sheet of track registration material having the property of forming damage tracks along paths traversed by alpha particles is exposed in an area to be monitored. Alpha particle tracks are formed when the material becomes irradiated. The tracks are counted and serve as a measure of the amount of radon and uranium daughter products present.

U.S. Pat. No. 4,055,762 shows a radon daughter dosimeter. The device is designed to detect radon gas alpha daughters in ambient air.

U.S. Pat. No. 3,825,751 shows a method and apparatus for detecting radioactive substances by measuring emitted gamma radiation. The process includes aerial radioactivity surveying.

SUMMARY OF THE INVENTION

The present invention overcomes the problems which exist in the prior art devices.

The present invention is based on evidence that daughter products of uranium in the U238 decay chain migrate and fractionate in the process of forming low concentration halos surrounding the deposit. The present invention detects the presence of Pb214, Bi214, Pb210 and Bi210 precursors using alpha sensitive photographic emulsions which record alpha decay of Po214 and Po210. The emulsions may be loaded in the field with a Pb-Bi-Po solution obtained from soil or rock samples. The solution is absorbed by the emulsion and displays alpha particle tracks upon microscopic examination. The concentration of alpha tracks as a function of sample size, volume of solution used, emulsion area and exposure time is a measure of the presence of daughter products surrounding a buried deposit containing uranium or thorium or radium. For example, alpha particle sensitive silver iodide nuclear emulsions manufactured by the Ilford Company of England may be employed. Similarly, deposits containing thorium are detected by looking at solutions containing Pb212, Bi212 and Po212 as indicated by characteristic alpha particle decays of Bi212 and Pi212. A chart of decay schemes of uranium and thorium is shown in the drawings.

Lengths of alpha tracks in exposed emulsions are characteristic and dependent on energy of alpha particles and half lives of the daughter products. These characteristics and controlled delays in exposing the emulsions to freshly prepared solutions obtained by selective, chemical leaching of the sample provide basis for distinguishing between specific daughter products such as Po210 from uranium and Po212 from thorium.

OBJECTS OF THE INVENTION

Objects of the invention are to provide an improved method for detecting deposits containing uranium or thorium, and to provide a radioactive mineral deposit detecting technique which detects the presence of daughter products below the surface of the ground.

Another object of the invention is to provide a method for detecting deposits of material having characteristic matter surrounding the deposit including collecting samples from beneath the surface of the ground in the vicinity of a deposit, studying the samples for characteristic matter, and calculating the location of the deposit based on the characteristic matter in the samples.

These and other and further objects and features of the invention are apparent in the disclosure which includes the above and below specification and claims.

DETAILED DESCRIPTION OF THE INVENTION

Generally, the present invention is a method for exploring for mineral deposits, in particular, deposits containing daughter products in the uranium and thorium decay chain which migrate away from the ore deposit and are fractionated in the process of forming very low concentration halos surrounding the deposit.

In the case of U238, the daughter products Th234, U234, Th230, Ra226 and Pb210, because of their relatively long half lives, different geochemical behavior and, in the case of Rn222, its physical behavior as a noble gas, participate in migration, transport and fraction processes. The present invention determines the location of buried uranium deposits by detecting the presence of radon and indirectly the other daughter products above radon in the decay chain. More particularly, the present techniques detect the presence of Pb214 and Bi214, as well as Pb210 and Bi210 by alpha activity of Po214 and Po210, respectively.

Subsurface soil or rock samples are collected in the vicinity of a suspected U238 deposit. Since most radon and other daughter products migrating away from a U238 deposit do not reach the surface but rather decay in the ground, it is important that subsurface samples be collected. Pb-Bi-Po solutions are obtained from the samples using any standard geochemical prospecting techniques for Pb and Bi, for example, either a weak HNO3 or ammonium citrate leach of the sample followed by dithizone extraction and, if necessary, back extraction of the dithizone with 0.02 N HNO3.

The Pb-Bi-Po solution may be loaded in the field on two sets of alpha sensitive photographic emulsions. The solution soaks into the emulsion and is absorbed by the emulsion. One of the loaded emulsions which is exposed for a short period of time records the decay of Po214 while the other of the loaded emulsions exposed for a longer time records the decay of Po210. Alternatively, Pb, Bi or Po may be plated and films exposed to the plates. Po may be plated directly on silver for exposure of the films, in one example.

Alpha particles from polonium 214 and 210 in the solution impinge on the emulsions and are recorded by the emulsions. The emulsions, after development, are examined microscopically for Po214 and Po210 alpha tracks. Po214 is used as the short term integrator of the movement of Rn222 and other daughter products such as radium 226, thorium 230, and uranium 234 and 238 through the soil. The Po210 decay is used as the long term integrator of Rn222 and other daughter products and is an indication of the presence of the immediate precursor pair Pb210-Bi210. As shown in the drawing Po214 results from decay of elements having half lives of minutes; Po210 results from decay of elements having half lives of years.

Population of alpha tracks as a function of sample size, volume of solution used, emulsion area and exposure is a measure of the concentration of daughter products in the sample. An anomalous population of alpha tracks would suggest presence of halos possibly containing very small concentrations of uranium or thorium and their daughter products and may be evidence for the presence and location of deposits containing uranium or thorium. Plotting the sample locations and normalized alpha track populations provides a means of identifying areas in which deposits may be found.

When looking for deposits containing thorium, alpha tracks characteristic of Bi212 and Po212 can be used.

While the invention has been described with reference to a specific embodiment, the exact nature and scope of the invention is defined in the following claims.

What is claimed is:

1. A field method for detecting and locating a deposit containing uranium and for distinquishing between uranium or thorium-containing deposits having characteristic radioactive daughter product matter near the deposit comprising
    collecting subsurface samples from a vicinity of the deposit,
    studying the samples for characteristic radioactive daughter product matter, which is a mixture of Pb214, Bi214, Po214, Pb210, Bi210 and Po210 detected by the alpha decay of Po214 and Po210 respectively in samples collected in the vicinity of a deposit containing U238, by steps further comprising
    chemically extracting Pb, Bi and Po in solutions from the samples,
    exposing first and second alpha sensitive photographic emulsions with the solutions,
    exposing the first emulsions to record decay of Po214,
    exposing the second emulsions to record decay of Po210,
    developing the emulsions,
    studying the first emulsions for Po214 alpha tracks,
    studying the second emulsions for Po210 alpha tracks, and
    plotting data from the studying to determine location of a deposit containing uranium.

2. The method of claim 1 wherein
    the samples are soil or rock.

3. The method of claim 1 wherein
    the characteristic radioactive daughter product matter are distributed in differentiated zones surrounding the deposit, and the samples are collected from the zones.

4. The method of claim 1 wherein the studying comprises
    determining the concentration of alpha tracks on the first emulsions as a function of sample size, volume of solutions and emulsion area, said determination being a direct short term integrator of movement of radon 222, and indirectly of the movement of radium 226 and thorium 230 as well as uranium 234 and 238, from the deposit,
    determining the concentration of alpha tracks on the second emulsions as a function of sample size, volume of solutions and emulsions area, and exposure, said determination being the long term integrator of the movement of Rn222 from the deposit and an indicator of the presence of Pb210-Bi210.

* * * * *